US007255031B2

(12) United States Patent
Nien et al.

(10) Patent No.: US 7,255,031 B2

(45) Date of Patent: Aug. 14, 2007

(54) VERTICAL CURTAIN CUTTER

(75) Inventors: Ming Nien, Taichung (TW); Wen-Yeu Lee, Taichung (TW); Kun-Ming Chuang, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 156 days.

(21) Appl. No.: 11/011,099

(22) Filed: Dec. 15, 2004

(65) Prior Publication Data

US 2006/0123963 A1 Jun. 15, 2006

(51) Int. Cl.

*B23D 23/00* (2006.01)

*B26D 1/06* (2006.01)

(52) U.S. Cl. ......................... 83/465; 83/454; 83/468.7; 83/522.19; 83/631; 83/694; 83/936; 83/949

(58) Field of Classification Search ................. 83/465, 83/522.19, 631, 694, 620, 454, 452, 197, 83/100, 375, 462, 622, 618, 619, 633, 485, 83/800, 435.11, 468.7, 936, 949; 160/84, 160/323.1; 29/433, 24.5

See application file for complete search history.

(56) References Cited

U.S. PATENT DOCUMENTS

| | | | | |
|---|---|---|---|---|
| 5,339,716 | A * | 8/1994 | Sands et al. | 83/452 |
| 5,799,557 | A * | 9/1998 | Wang | 83/639.5 |
| 6,079,306 | A * | 6/2000 | Liu | 83/454 |
| 6,240,824 | B1 * | 6/2001 | Hsu | 83/622 |
| 6,412,381 | B1 * | 7/2002 | Wang et al. | 83/454 |
| 6,427,571 | B1 * | 8/2002 | Hsu | 83/454 |
| 6,435,117 | B2 * | 8/2002 | Codos et al. | 112/475.08 |
| 6,945,152 | B2 * | 9/2005 | Jabbari et al. | 83/468.7 |
| 2002/0148338 | A1 * | 10/2002 | Huang | 83/631 |
| 2003/0140756 | A1 * | 7/2003 | Lin et al. | 83/454 |
| 2004/0031366 | A1 * | 2/2004 | Huang | 83/454 |
| 2004/0173079 | A1 * | 9/2004 | Caputo et al. | 83/694 |
| 2004/0237740 | A1 * | 12/2004 | Marocco | 83/197 |
| 2005/0000345 | A1 * | 1/2005 | Schimmels | 83/633 |
| 2005/0005750 | A1 * | 1/2005 | Lin et al. | 83/167 |
| 2005/0150342 | A1 * | 7/2005 | Cheng | 83/522.19 |

* cited by examiner

*Primary Examiner*—Boyer D. Ashley

*Assistant Examiner*—Ghassem Alie

(74) *Attorney, Agent, or Firm*—Troxell Law Office, PLLC

(57) ABSTRACT

A vertical curtain cutter includes at least a base and a mold cutting device fixed on the base, which consists of a clamper, a knife and a motor. The clamper has a stationary clamp block and a movable clamp block, and the stationary clamp block has a flat clamp surface at one side and a curved clamp surface at other side. As a result, the movable clamp block and the stationary clamp block can clamp between them the rolled curtain cloth or folded-up curtain cloth. The cloth is vertically inserted by reversing the flat surface and the curved surface of the stationary clamp block. The motor can drive the knife to shift towards the curtain cloth and cut it, so that the cutter is able to cut either rolled or folded-up curtain cloth into multiple curtain pieces.

8 Claims, 9 Drawing Sheets

VERTICAL CURTAIN CUTTER

BACKGROUND OF THE INVENTION

1. Field of the Invention

This invention relates to a cutter, particularly to one able to cut either rolled curtain cloth or folded-up curtain cloth, with a small space for storing and handling and, also, convenience of use.

2. Description of the Prior Art

Nowadays, many products are offered with DIY designs for consumers to make and process, such as curtains, which can be made by consumers themselves by using a cutter to cut cloth into the length according to their needs, and then the curtains can be assembled and installed.

However, conventional cutters are generally for wooden works, having a large dimensions and a heavy weight, with a horizontal material feeding structure which occupies a large space, resulting in high cost and inconvenience for a user, especially for cutting long curtains. As a result, these conventional cutters are not popular with consumers.

SUMMARY OF THE INVENTION

This invention has been devised to offer a vertical curtain cutter, which includes at least a base, a mold cutting device fixed on the base consisting of a clamper, a knife and a motor. The clamper is provided with a stationary clamp block and a mobile clamp block for rolled curtain cloth or folded-up curtain cloth vertically sustained. The motor moves the knife in a lateral direction towards the curtain cloth which is capable of cutting either rolled curtain cloth or folded-up curtain cloth, in addition to a vertical material feeding configuration so that the space for storing and handling can be effectively made as small as possible, and its use safe, and its handling convenient.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
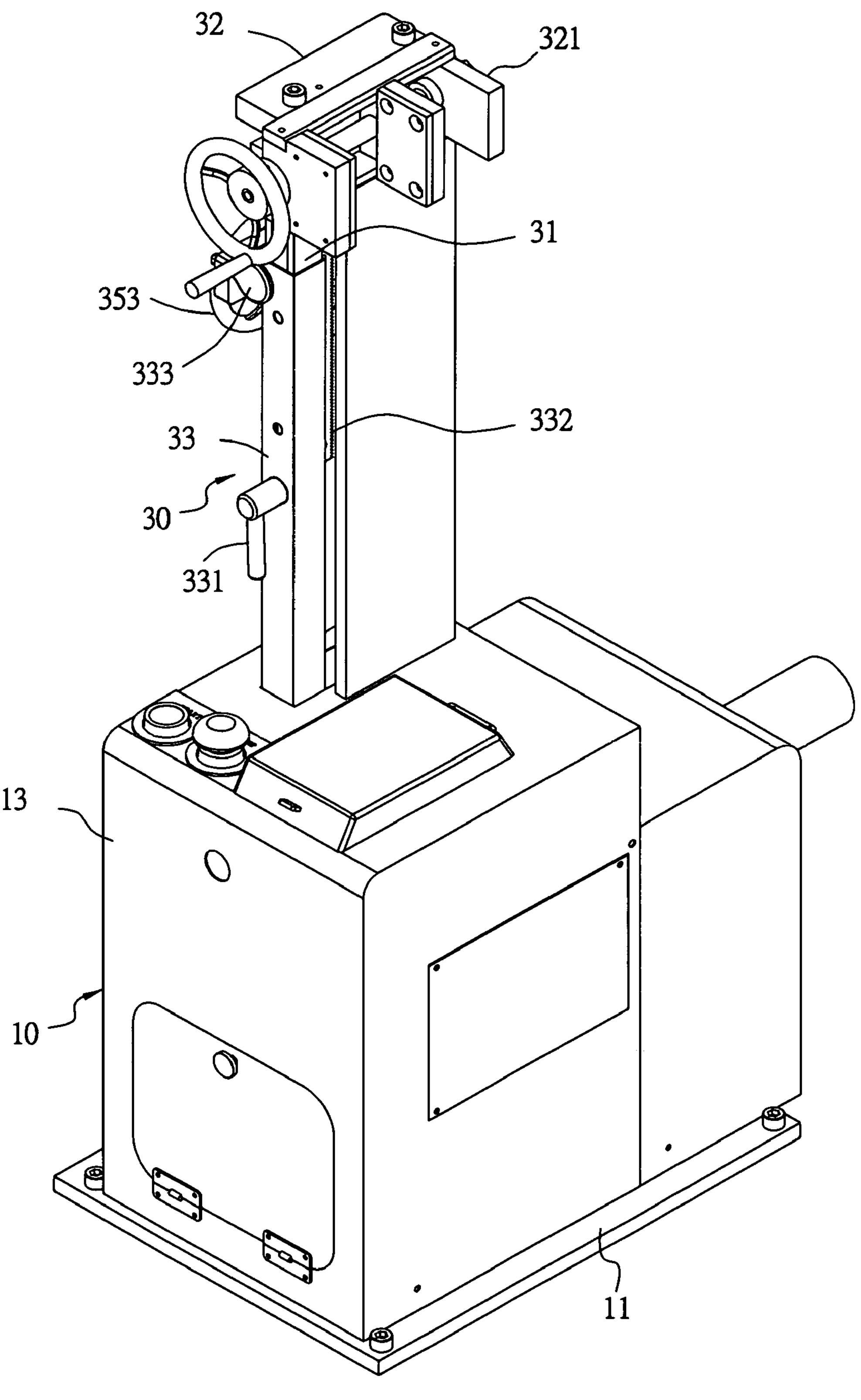
FIG. 1 is a perspective view of a vertical curtain cutter in the present invention.
Figure 2:
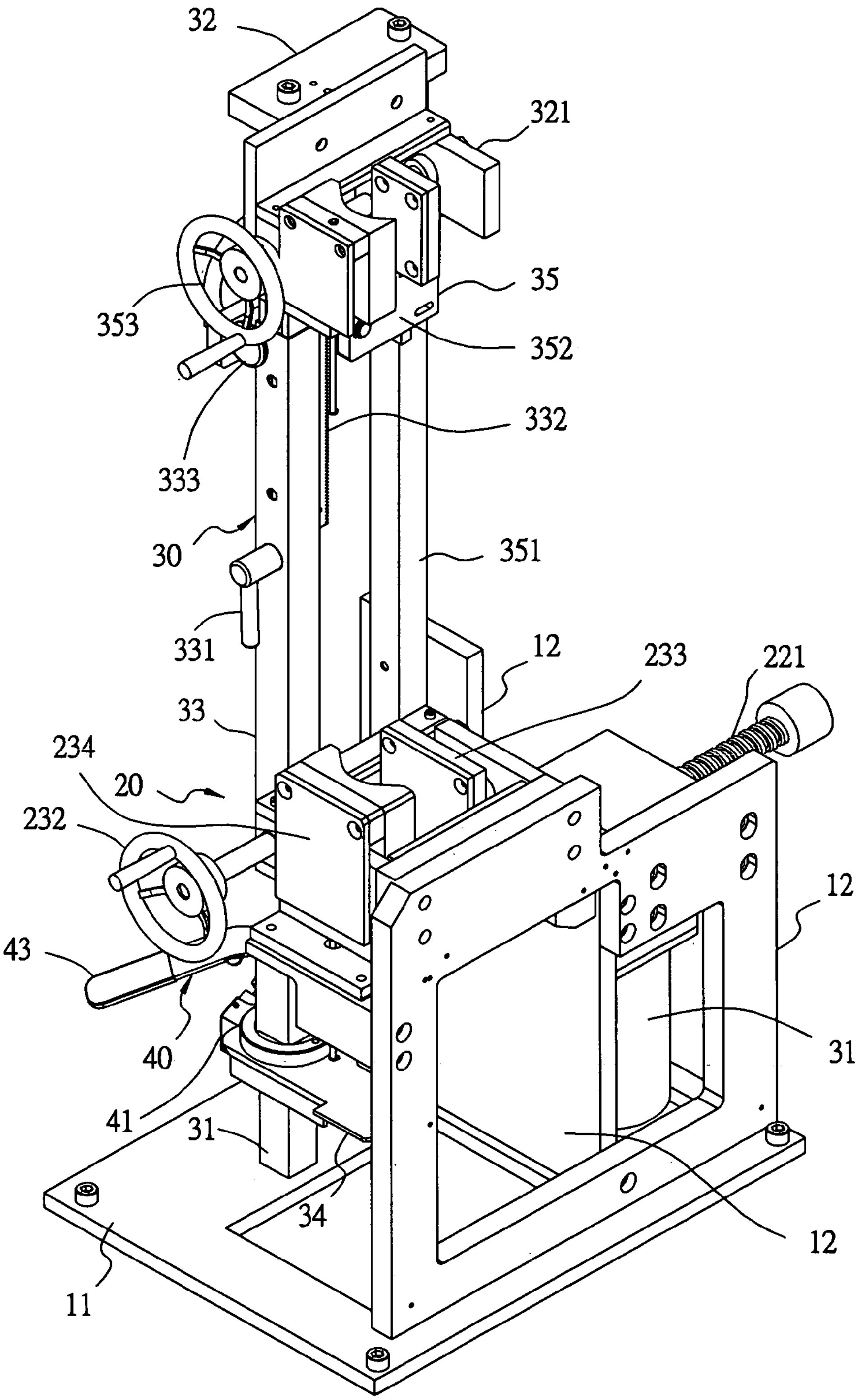
FIG. 2 is a perspective view of the inner structure of the vertical curtain cutter in the present invention.

A preferred embodiment of a vertical curtain cutter in the present invention, as shown in FIGS. 1 and 2, includes a base 10, a mold cutting device 20, a sustain frame 30 and a side cap remover 40 as main components combined together.

The base 10 is provided with a base plate 11, and plural stationary plates 12 connected on the base plate 11, and a housing 13 hides the stationary plates 12 on the base 10.

Figure 3:
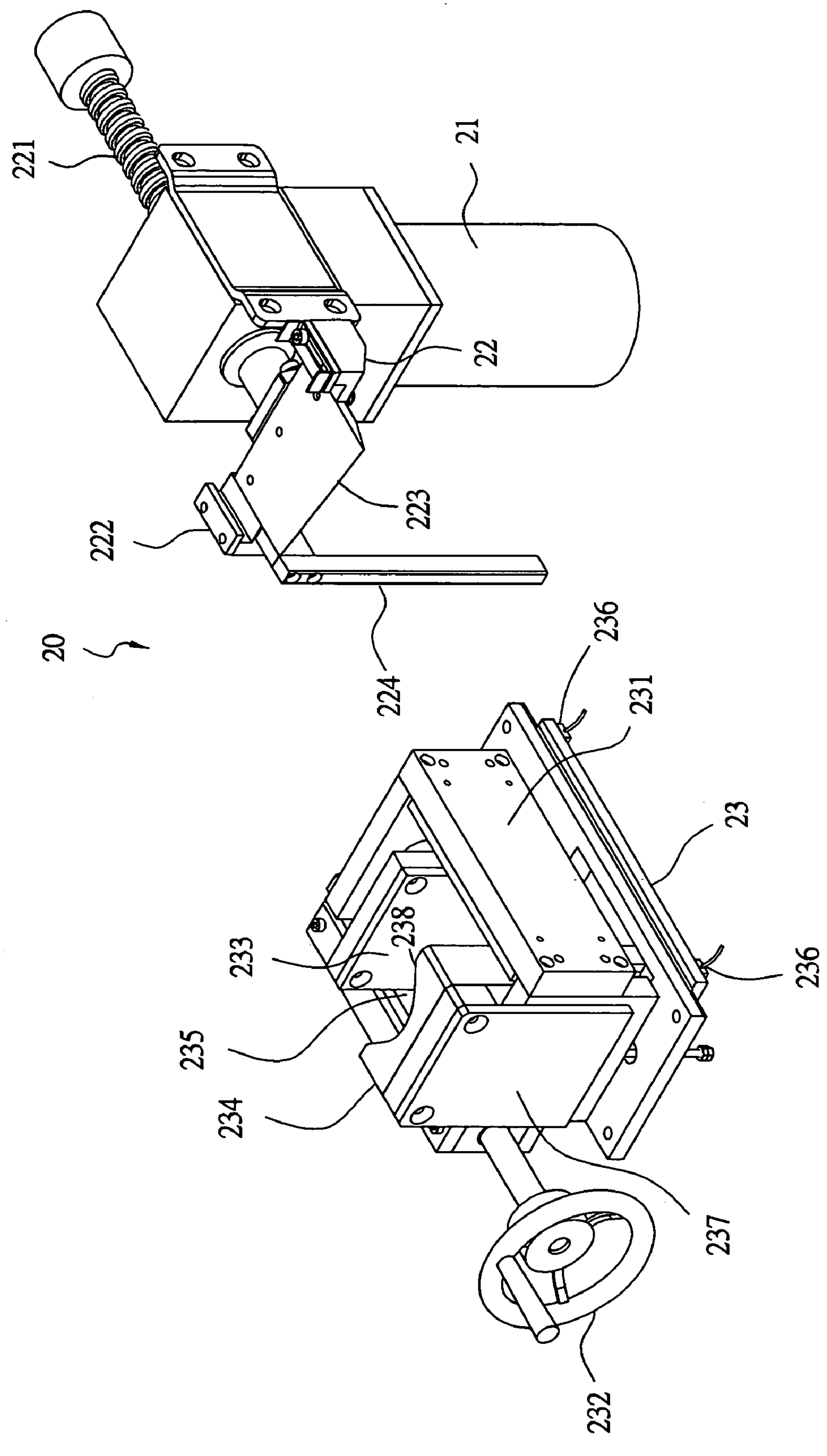
FIG. 3 is a partial exploded perspective view of a mold cutting device in the present invention.
Figure 4:
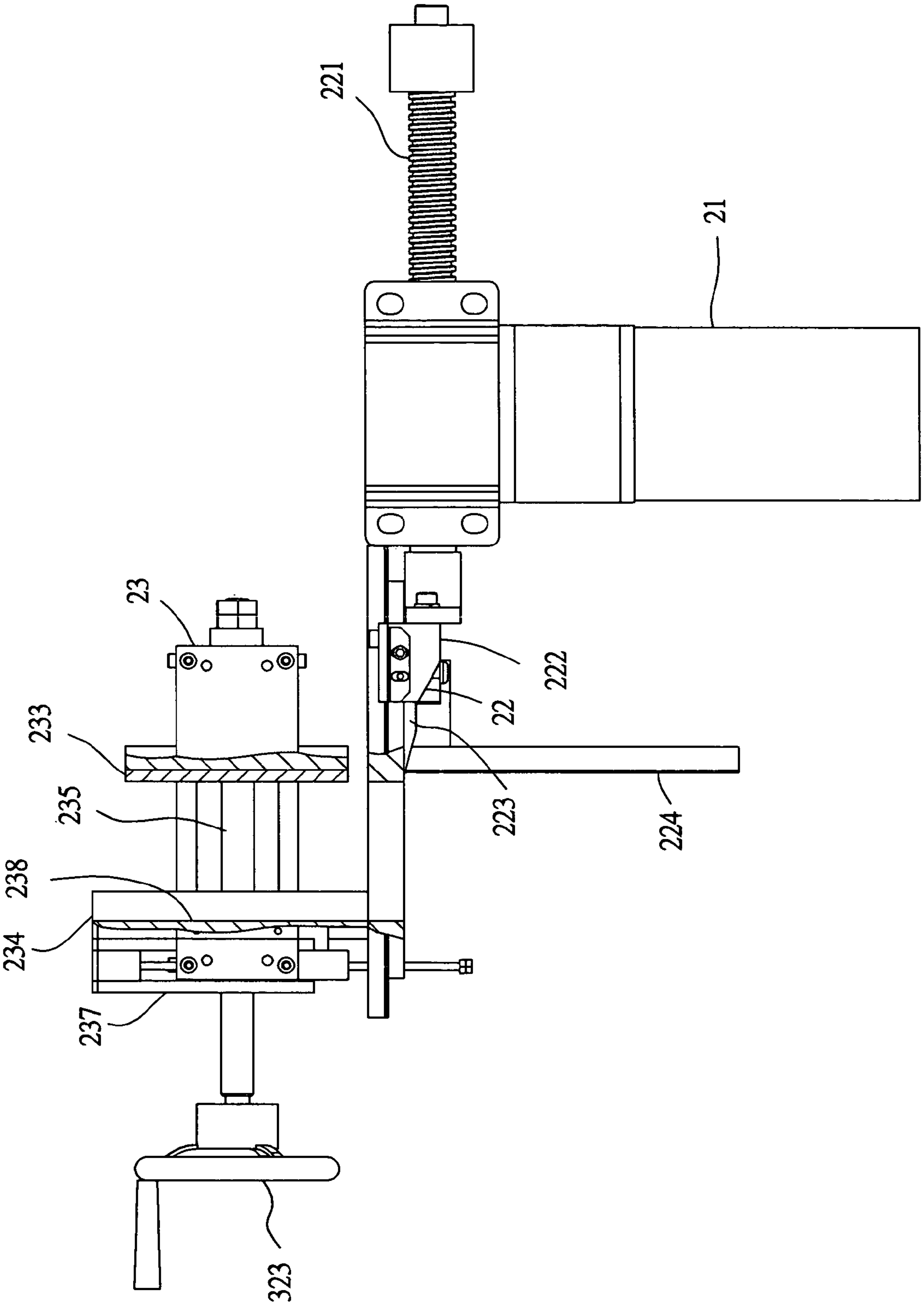
FIG. 4 is a side view of the mold cutting device in the present invention.

The mold cutting device 20, as shown in FIGS. 3 and 4, is positioned on the base 10 and is hidden in the housing 13, consisting of a motor 21, a knife 22 and a clamper 23. The motor 21 is fixed firmly on one of the stationary plates 12, and the knife 22 has an interacting rod 221 driven by the motor 21 to move straight back and forth, having a knife base 222 fixed at one end, a conical blade 223 formed in the front portion of the knife base 222, and a lengthwise actuating rod 224 extending down from one side. The conical blade 223 and the actuating rod 224 are configured to move laterally together with the interacting rod 221. The clamper 23 is fixed tightly on a proper location of the stationary plates 12, having a clamper body 231, a tighten handle 232, a movable clamp block 233 and a stationary clamp block 234. The clamper body 231 has a rectangular vertical hole 235 in the center portion, and its lower end fitting and sliding with the knife base 222. Two limit switches 236 located at proper points of the clamper body 231 so as to sense the location of the blade 223 of the knife 22 so that the knife 22 may automatically return to its original position after one cutting action. The tighten handle 232 is pivotally connected with the clamper body 231. As a result, it is possible to rotate the movable clamp block 233 fitted in the vertical hole 235. The stationary clamp block 234 is inserted in the clamper body 231 at the other side of the movable clamp block 233, having a flat clamp surface 237 at one side and a curved clamp surface 238 at the other side. When one end of a rolled curtain cloth 50 is inserted from above in the vertical hole 235 of the clamper 23, it will be clamped tightly between the movable clamp block 233 and the curved clamp surface 238 of the stationary clamp block 234. The motor 21 can then be started to drive the blade 223 of the knife 22 to shift laterally toward the rolled curtain cloth 50 or the folded-up curtain cloths 60 to carry out mold cutting.

Figure 5:
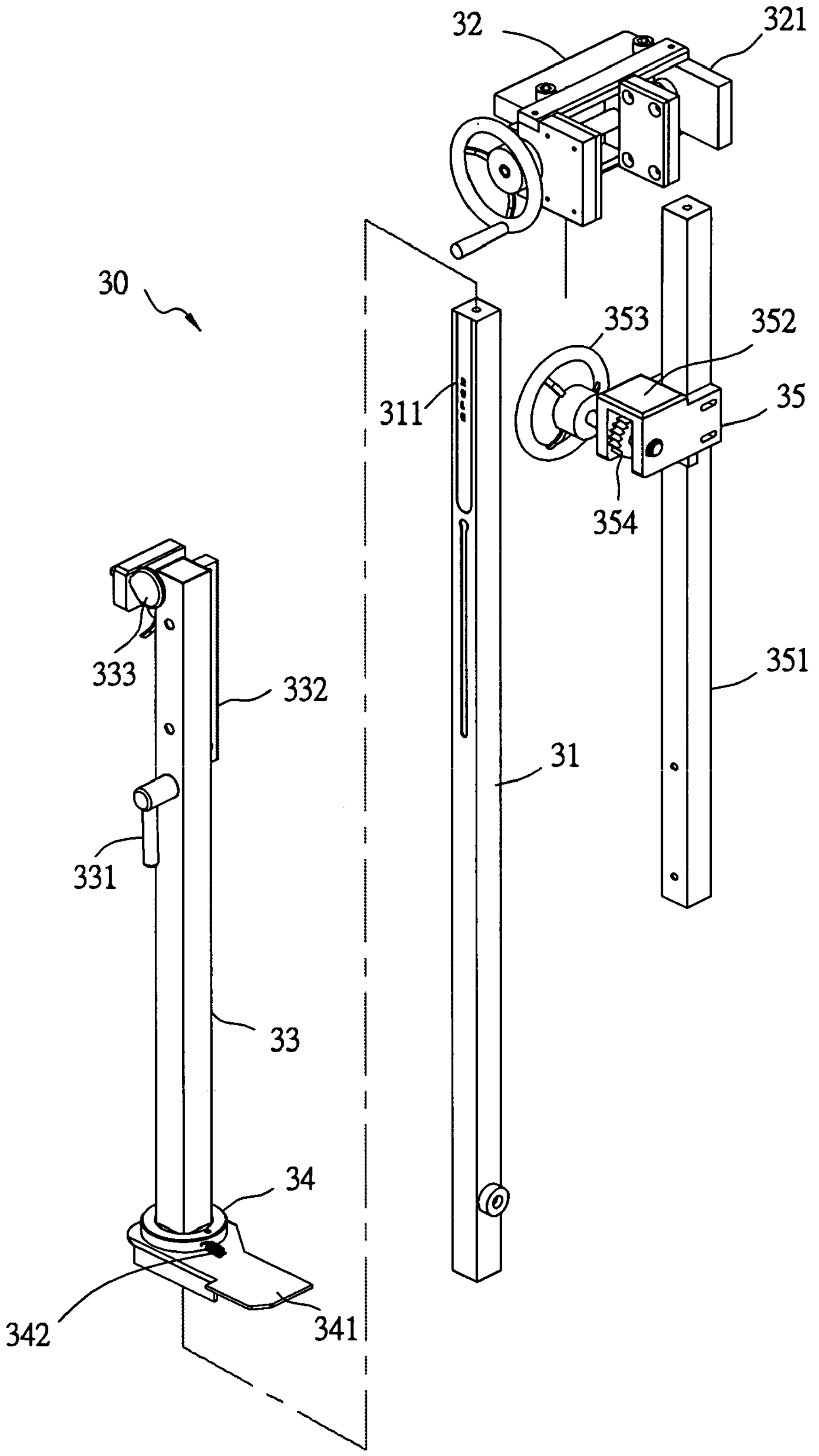
FIG. 5 is an exploded perspective view of a sustain frame in the present invention.

The sustain frame 30, as shown in FIG. 5, is located abutting to the mold cutting device 20 in the housing 13, consisting of a stationary rod 31, a clamper 32, a sleeve 33, a stop block 34 and an up-and-down adjusting unit 35.

The stationary rod 31 extends up from the base plates 11 of the base 10, having a ruler 311 fixed on an upper portion. The clamper 32 is fixed on the top of the stationary rod 31, having a limit base 321 facing the clamper 23 of the mold cutting device 20, which clamps the upper end of the rolled curtain cloth 50 or the folded-up curtain cloth 60. The sleeve 33 fits around the stationary rod 31 making it possible to move the sleeve 33 up and down relative to the stationary rod 31 by adjustment. A tighten grip 331 is provided on the outer surface to tighten or loosen the sleeve 33 to the stationary rod 31 after adjustment.

The stop block 34 is combined movable with the lower end of the sleeve 33, having a receiving plate 341 extending sidewise for receiving the lower end of the rolled curtain cloth 50 or the folded-up curtain cloth 60, and moving together with the sleeve 33 for controlling the length of either of the two curtain cloth 50 and 60 to be cut. Furthermore, the receiving plate 341 faces the actuating rod 224 of the mold cutting device 20 and is moved by the actuating rod 224 if the knife base 222 is moved forward so as to permit a cut curtain piece to fall down. Further, a spring 342 is provided between the sleeve 33 and the stop block 34, so that the receiving plate 34 elastically returns to its original position when the actuating rod 224 retreats with the knife base 222.

The up-and-down adjusting unit 35 has a vertical tube 351 with its lower end connected to the base 10, and an up-and-down base 352 fixed on the vertical tube 351, a wind handle 353 pivotally connected to the up-and-down base 352. The wind handle 353 rotates a gear wheel 354 engaging with a rack 332 fixed on an upper side surface of the sleeve 33. Then, a user manually rotates the wind handle 353, which then moves the sleeve 33 up or down. The rack 332 has a magnifying lens 333 fixed on a next side of the rack 333, facing just the ruler 311 for magnifying the graduations of the ruler 311 for the user to check the adjusted cut length of the two curtain cloths 50 and 60.

Figure 6:
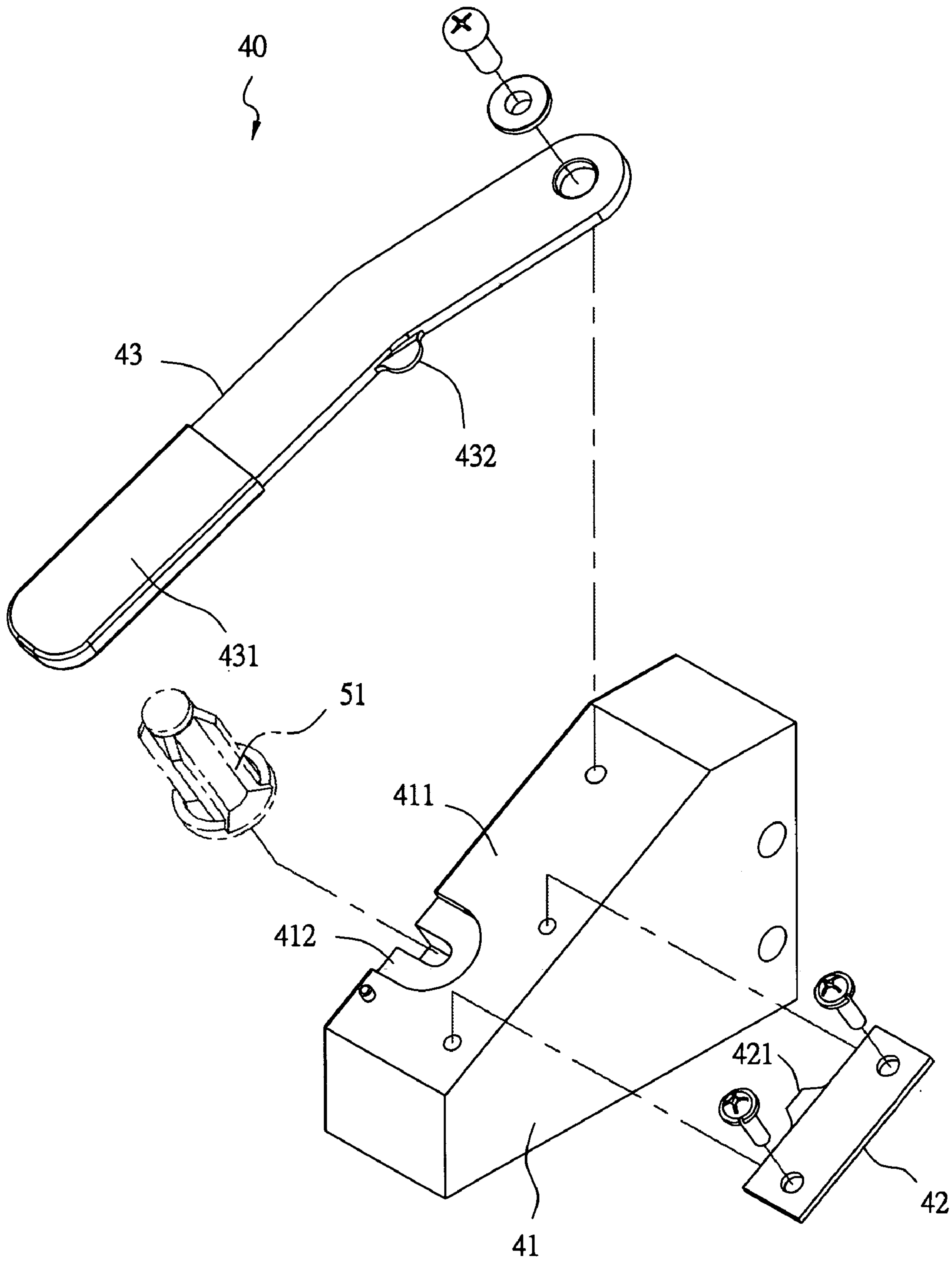
FIG. 6 is an exploded perspective view of a side cap remover in the present invention.

The side cap remover 40, as shown in FIG. 6, is positioned at a proper location outside of the housing 13, and consists of a position base 41, a stationary plate 42, and a movable plate 43.

The position base 41 is fixed firmly on the base plate 11 of the base 10, having a top inclined surface 411 and a position notch 412 in one of the lengthwise sides for the side cap 51 at the front end of the rolled curtain cloth 50 to fit stably therein. The stationary plate 42 is fixed on the other lengthwise side of the inclined surface 411, having a hook edge 421 in the intermediate portion to insert in a gap formed between the roller curtain cloth 50 and the side cap 51. The movable plate 43 is pivotally connected to the other side of the inclined surface 411 of the position base 41. The movable plate 43 has a grip 431 formed in a lower portion and a semicircular hook edge 432 formed to protrude from the intermediate portion for inserting in a gap between the roll curtain cloth 50 and the side cap 51 during the shifting of the movable plate 43 toward the rolled curtain cloth 50. The movable plate 43 and the stationary plate 42 forms a common clamping condition to let the rolled curtain cloth 50 separate from the side cap 51 when the curtain cloth 50 is pulled outward.

Next, two different cutting processes of the rolled curtain cloth 50 and the folded-up curtain cloth 60 are described below.

Figure 7:
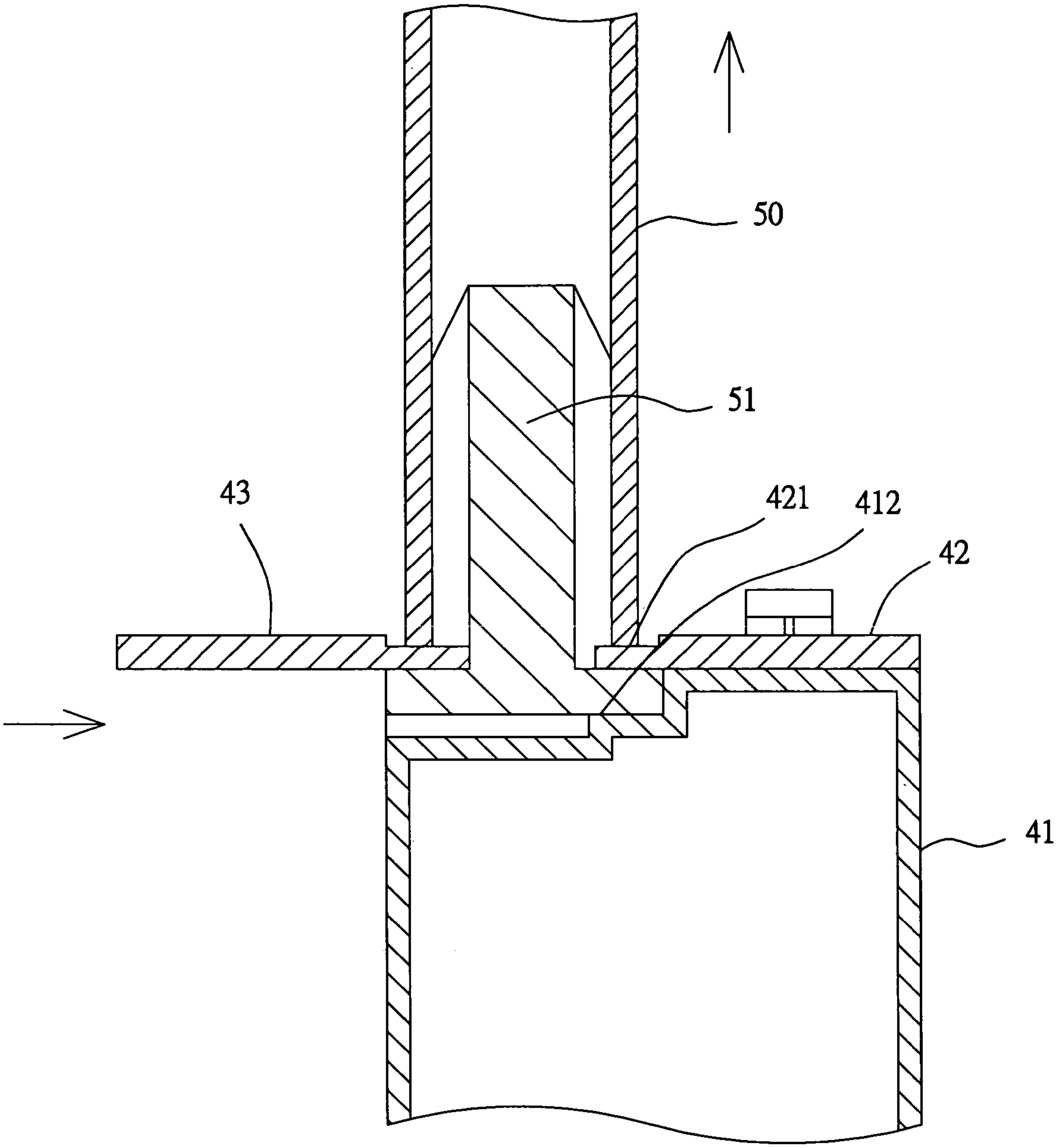
FIG. 7 is a cross-sectional view of the side cap remover in the removing condition in the present invention.
Figure 8:
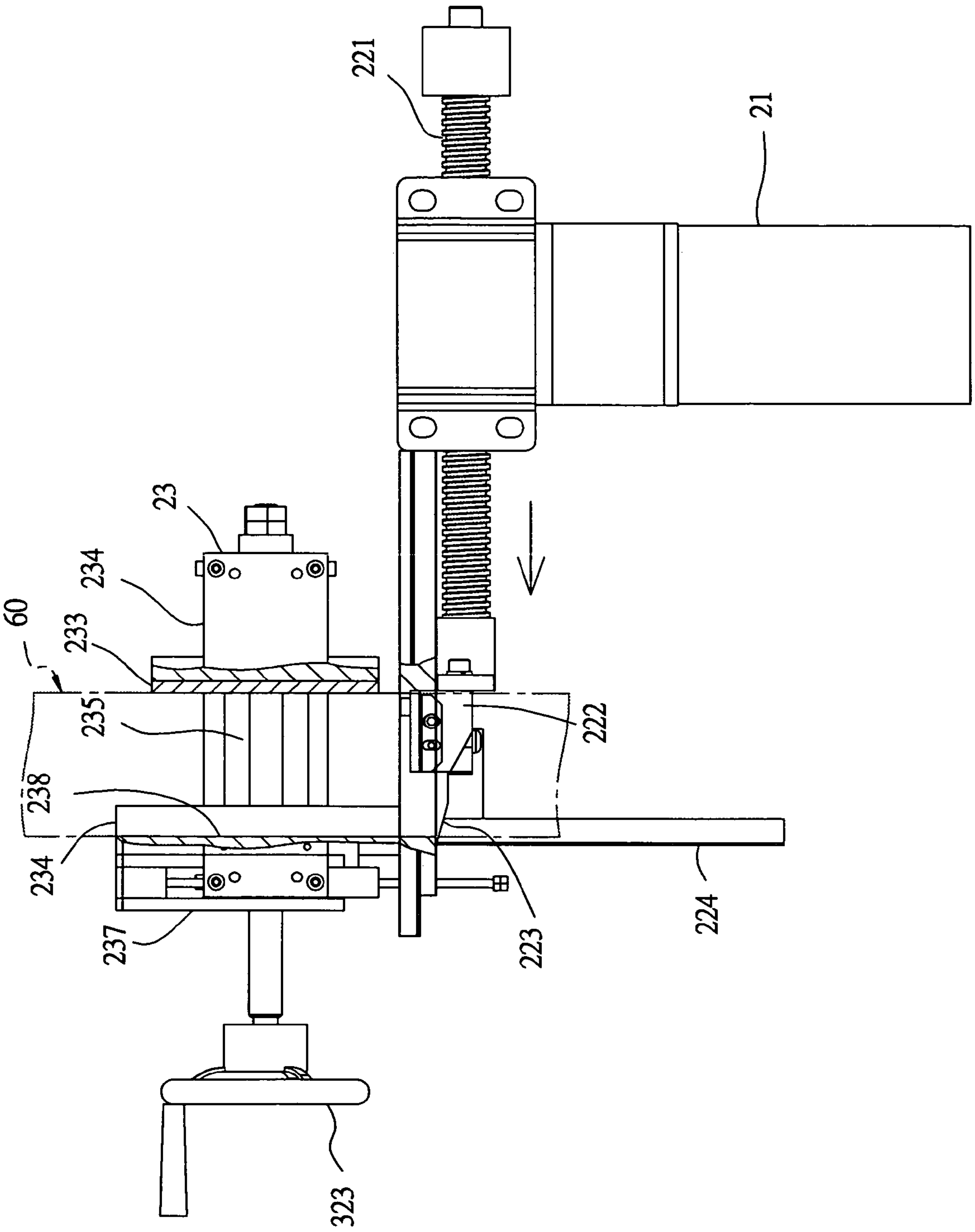
FIG. 8 is a side view of the mold cutting device under a cutting condition in the present invention; and, FIG. 9 is a perspective view of the sustain frame under a moderating condition in the present invention.
Figure 9:
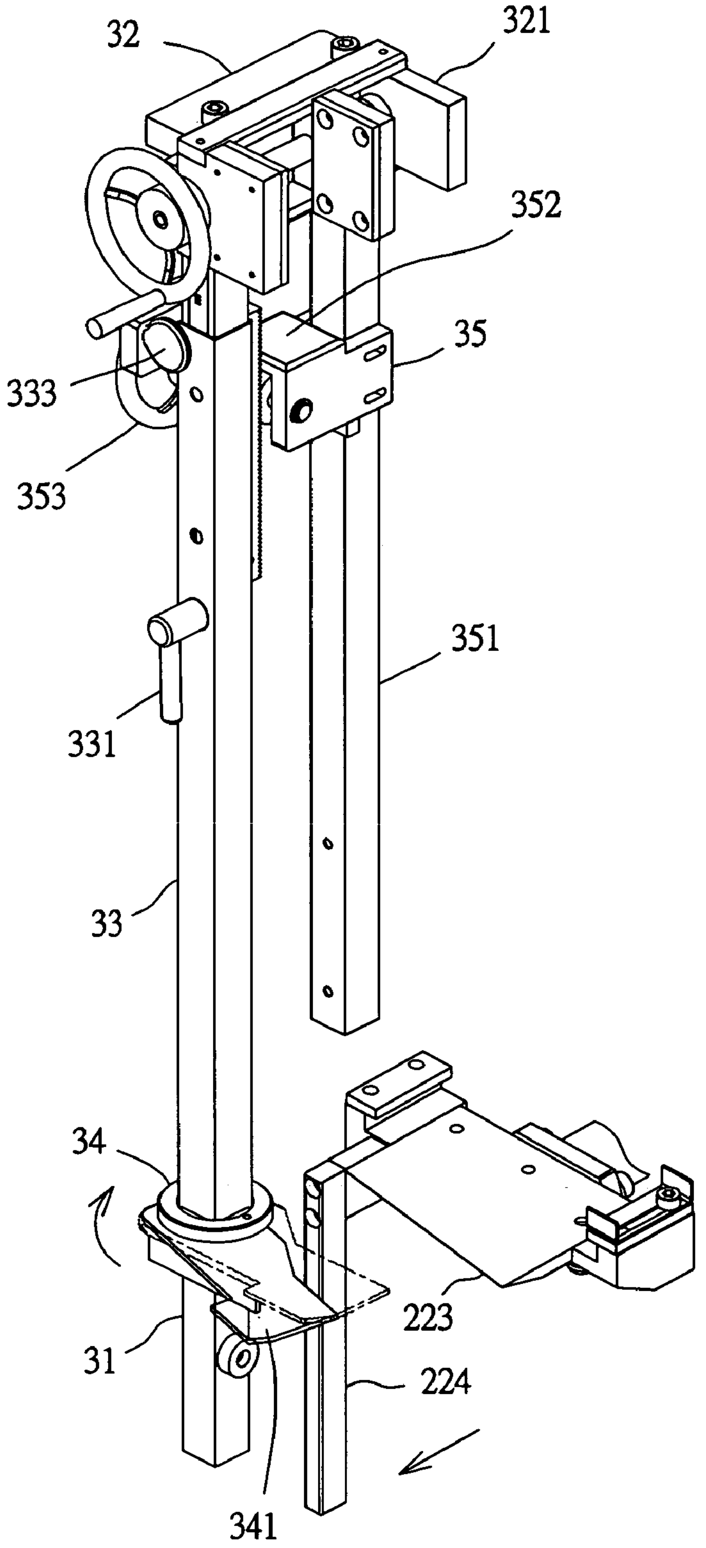

(1) The rolled curtain cloth: Referring to FIG. 2, a user loosens the tighten handle 331 and observes the ruler 311 of the stationary rod 31, and rotates the wind handle 353 of the up-and-down adjusting unit 35 to move up or down the sleeve 33 to the length of the cloth to be cut and, then, tightens the handle 353. Then referring to FIG. 7, the rolled curtain cloth 50 is inserted in the stationary plate 42 of side cap remover 40, and the grip 431 of the movable plate 43 is held and moved to make the side cap 51 clamped between the stationary plate 42 and the movable plate 43. Then the roll curtain cloth 50 is pulled up to separate from the side cap 51. Further, the roll curtain cloth 50 is inserted in the hole 235 of the clamper 23 to reach the receiving plate 341 of the stop block 34, as shown in FIG. 9. Then the tighten handle 232 is rotated to let the roll curtain cloth 50 be clamped between the movable block 233 and the stationary block 234. Now it is especially important that the curved clamp surface 238 of the stationary block 234 faces the movable block 233, otherwise the rolled curtain cloth cannot be clamped. After the roll curtain cloth 50 has been clamped, the top of the roll curtain cloth 50 is clamped in the limit base 32 of the sustain frame 30. Then the motor 21 of the mold cutting device 20 is started, driving the interacting rod 221 together with the knife base 222 which shifts, sliding laterally under the clamp body 231 to move the blade 223 forward at the front of the knife base 222 and to, therefore, cut off the rolled curtain cloth 50 (as shown in FIG. 9). During forward movement and cutting, the actuating rod 224 beside the knife base 222 will move forward with the knife base 222, and forces the receiving plate of the stop block 34 to properly rotate to thereby permit the cut-off curtain piece 50 to fall down smoothly. Then the motor 21 is stopped. The processes just described are repeated for cutting the whole rolled curtain cloth 50 completely into many pieces.

(2) Folded-up curtain cloth: The cutting processes for this folded-up curtain cloth are almost the same as those for the rolled curtain cloth, except that the side cap 51 is not used, so there is no step of removing the side cap 51. As the folded-up curtain cloth has a rectangular cross-section, the stationary block 234 of the clamper 23 has to be moved up to be taken off and reversed in its direction so as to let the clamp flat surface 237 face the movable clamp block 233. Then, the folded-up curtain cloth 60 can be clamped smoothly for the subsequent cutting action.

The invention has the following advantages as can be understood from the foresaid description.

1. It has small dimensions, with the mold cutting device 20 having a vertical material feeding structure, so the space needed for storing and handling can be as small as possible.
2. The clamper 23 is provided with both the flat clamp surface 237 and the curved clamp surface 238 to be used interchangeably for clamping both the rolled or folded-up curtain cloth 50 and 60, thereby offering high efficiency and convenience.
3. The sustain frame 30 has the sleeve 33 which is raised or lowered by the wind handle 353 for effectively upgrading the speed for deciding the length of the curtain cloth to be cut.
4. The sustain frame 30 has the stop block 34 able to be rotated by the knife 22 which is moved forward and is returned by the elasticity of the spring 342 after the knife 22 is retreated, with the cut curtain piece falling automatically without manual work.
5. The side cap remover 40 can remove the side cap 51 of the roll curtain cloth 50. Therefore preliminary work before cutting work can be done quickly.
6. The mold cutting device 20 is automatically returned to its original position after cutting once, making the device 20 easy to handle.
7. The mold cutting device 20 is wholly hidden in the housing 13, making it very safe to use without the possibility of small children touching or tampering with it.
8. The magnifying lens 333 provided at one side of the rack 332 of the up-and-down adjusting unit 35 faces the ruler 311 of the stationary rod 31, so a user can check clearly the graduations of the ruler 311 for adjusting the length of the curtain cloth to be cut.

While the preferred embodiments of the invention have been described above, it will be recognized and understood that various modifications may be made therein and the appended claims are intended to cover all such modifications that may fall within the spirit and scope of the invention.

What is claimed is:

1. A vertical curtain cutter comprising:

a base; and a mold cutting device fixed on said base, the mold cutting device being configured to allow both rolled curtain cloth and folded-up curtain cloth to be inserted vertically into said molding device, said cutting device having a knife configured to be both moved laterally toward said curtain cloth and cut said curtain cloth wherein said mold cutting device comprises a clamper and a motor, said clamper is provided with an insert hole for securing said rolled curtain cloth or said folded-up curtain cloth by clamping, said motor being configured to drive said knife to both move towards and cut said rolled curtain cloth or said folded-up curtain cloth, wherein said clamper has a clamper body, a tighten handle, a movable clamp block and a stationary clamp block, said clamp body is provided with an insert hole in the center portion and a limit switch at a proper location for sensing the location of said knife moving so that said knife may automatically be returned to its original position, and said tighten handle rotates with respect to said clamp body for moving said movable clamp block by rotating, wherein said stationary clamp block is inserted in said movable clamp block, having a flat clamp surface at one side and a curved clamp surface at the other side so that said stationary clamp block may have its flat clamp surface for clamping folded-up curtain cloth and its curved clamp surface for clamping rolled curtain cloth by matching with said movable clamp block.

2. The vertical curtain cutter as claimed in claim 1, wherein a sustain frame is further provided on said base, said sustain frame having a stationary rod extending up from said base and a clamper fixed around said stationary rod, said clamper having a limit base facing said clamper of said mold cutting device for clamping stably said rolled curtain cloth or said folded-up curtain cloth.

3. The vertical curtain cutter as claimed in claim 1, wherein a side cap remover is further provided on said base, having a position base, a stationary plate and a movable plate, said stationary plate fixed on one side of the position base for securing the front end of said rolled curtain cloth, said movable plate pivotally connected to the other side of said position base to be secured at the other side of said side cap by pivotal rotation so as to clamp the two sides of said side cap to permit said rolled curtain cloth to easily separate from said side cap in case of said rolled curtain cloth being pulled outward.

4. The vertical curtain cutter as claimed in claim 1, wherein said knife further has an interacting rod to be shifted by said motor and having a knife base fixed at its end, and said knife base has a blade, possible to slide moving on said clamper.

5. The vertical curtain cutter as claimed in claim 2, wherein said stationary rod has a ruler fixed on one side of an upper portion, and a sleeve is fitted movable around said stationary rod and has a stop block provided movable around its lower end for receiving a lower end of either rolled curtain cloth or folded-up curtain cloth, said stop block can duly rotate in case of said knife being moved forward so that cut curtain piece may fall down, and said stop block can automatically be returned to its original position in case of said knife retreated, and a tighten grip is provided at an upper portion for tighten or loosen said sleeve to said stationary rod.

6. The vertical curtain cutter as claimed in claim 5, wherein a magnifying lens is further provided on a proper location of said sleeve for magnifying said ruler.

7. The vertical curtain cutter as claimed in claim 2, wherein said limit base of said sustain frame is provided with an insert hole for clamping the upper end of the roll curtain cloth or the folded-up curtain cloth.

8. The vertical curtain cutter as claimed in claim 1, wherein an up-down adjusting unit is further provided for matching said sleeve, consisting of a base tube connected to said base at a lower end, an up-down base fixed on said base tube, said up-and-down base is connected with a wind handle, which then rotates a gear wheel engaging with a rack connected to said sleeve, so that rotation of said wind handle can move up and down said sleeve.

* * * * *